US010108883B2

(12) United States Patent
Becker et al.

(10) Patent No.: US 10,108,883 B2
(45) Date of Patent: Oct. 23, 2018

(54) IMAGE QUALITY ASSESSMENT AND IMPROVEMENT FOR PERFORMING OPTICAL CHARACTER RECOGNITION

(71) Applicant: INTUIT INC., Mountain View, CA (US)

(72) Inventors: Richard J. Becker, Mountain View, CA (US); Rakesh Kandpal, Mountain View, CA (US); Priya Kothari, Mountain View, CA (US); Sheldon Porcina, Alberta (CA); Pavlo Malynin, Alberta (CA)

(73) Assignee: INTUIT INC., Mountain View, CA (US)

( * ) Notice: Subject to any disclaimer, the term of this patent is extended or adjusted under 35 U.S.C. 154(b) by 39 days.

(21) Appl. No.: 15/337,285

(22) Filed: Oct. 28, 2016

(65) Prior Publication Data

US 2018/0121756 A1 May 3, 2018

(51) Int. Cl.
*G06K 9/62* (2006.01)
*G06K 9/00* (2006.01)
*G06K 9/18* (2006.01)

(52) U.S. Cl.
CPC ....... *G06K 9/6206* (2013.01); *G06K 9/00469* (2013.01); *G06K 9/18* (2013.01); *G06K 9/6255* (2013.01)

(58) Field of Classification Search
None
See application file for complete search history.

(56) References Cited

U.S. PATENT DOCUMENTS

2012/0099792 A1 4/2012 Chevion et al.
2013/0279759 A1 10/2013 Kagarlitsky et al.
2015/0286888 A1 10/2015 Maison

OTHER PUBLICATIONS

International Search Report and Written Opinion dated Jan. 23, 2017 for Application No. PCT/US2016/059768.

*Primary Examiner* — Stephen Coleman
(74) *Attorney, Agent, or Firm* — Patterson + Sheridan, LLP

(57) ABSTRACT

Techniques are disclosed for performing optical character recognition (OCR) by assessing and improving quality of electronic documents to perform the OCR. For example a method for identifying information in an electronic document includes obtaining a reference image of the electronic document, distorting the reference image by adjusting different sets of one or more parameters associated with a quality of the reference image to generate a plurality of distorted images, analyzing each distorted image to detect the adjusted set of parameters and corresponding adjusted values, determining an accuracy of detection of the set of parameters and the adjusted values, and training a model based at least on the plurality of distorted images and the accuracy of the detection, wherein the trained model determines at least a first technique for adjusting a set of parameters in a second image to prepare the second image for optical character recognition.

20 Claims, 6 Drawing Sheets

IMAGE QUALITY ASSESSMENT AND IMPROVEMENT FOR PERFORMING OPTICAL CHARACTER RECOGNITION

FIELD

The present disclosure relates to techniques for extracting data from documents. More specifically, the present disclosure relates to techniques for facilitating optical character recognition (OCR) by assessing and improving the quality of an image for performing the OCR.

BACKGROUND

Data processing and exchange are essential for a variety of businesses and personal transactions. For example, small businesses use accounting and inventory data to obtain and share reports regarding inventory sales, customer invoices, or cash flow. Similarly, healthcare providers examine medical records to view patient information related to insurance providers, medical conditions, or office visits.

In addition, data exchange frequently relies on document exchange including electronic versions of documents such as word-processing documents, spreadsheets, or Portable Document Format (PDF) documents and paper documents (e.g., which may be generated electronically). For example, a business may manage business transactions with a set of customers by creating a set of bills, invoices, or other types of documents containing data associated with the business transactions and sending the documents to the respective customers. The customers use the data in the documents to pay the bills or invoices, respond to the business, or update their records of the transactions. Similarly, companies, banks and mortgage companies may provide several tax documents (e.g., W-2, 1099-Int, etc.) to employees and customers as needed to file their tax returns, for example, by using commercially available income tax preparation software.

Optical character recognition (OCR) systems are generally used to detect text present in an image of a document (e.g., a tax document) and to convert the detected text into a machine readable representation. Digital camera and mobile document image acquisition are becoming increasingly popular in the world of optical character recognition and text recognition. In order to accurately recognize text with a conventional OCR engine, the image typically needs to be of a high quality. However, images produced, for example, using digital cameras and other mobile devices may include many distortions and may produce images of poor quality. The quality of an image depends on various factors including quality of camera used to produce the image, power of the lens, resolution, light intensity, relative motion between the camera and the text document, level of focus, background including back lighting, and the like, in addition to quality of the text document. Thus, an image produced using such a device may include various forms of distortion including blur, skew, rotation, shadow marks and other forms of distortion.

As a result, a computing device performing optical character recognition on an image of the document may have difficulty extracting information from a given document for use by other applications (e.g., tax preparation application). Instead, the recipient or document owner may have to manually enter data from the document into an application.

SUMMARY

One embodiment presented herein includes a computer-implemented method for identifying information in an electronic document. The method generally includes obtaining a reference image of the electronic document, distorting the reference image by adjusting different sets of one or more parameters associated with a quality of the reference image to generate a plurality of distorted images, analyzing each distorted image to detect the adjusted set of parameters and corresponding adjusted values, determining an accuracy of detection of the set of parameters and the adjusted values, and training a model based at least on the plurality of distorted images and the accuracy of the detection, wherein the trained model determines at least a first technique for adjusting a set of parameters in a second image to prepare the second image for optical character recognition.

One embodiment presented herein includes an apparatus for identifying information in an electronic document. The apparatus includes at least one processor and a memory coupled to the at least one processor. The at least one processor is generally configured to obtain a reference image of the electronic document, distort the reference image by adjusting different sets of one or more parameters associated with a quality of the reference image to generate a plurality of distorted images, analyze each distorted image to detect the adjusted set of parameters and corresponding adjusted values, determine an accuracy of detection of the set of parameters and the adjusted values, and train a model based at least on the plurality of distorted images and the accuracy of the detection, wherein the trained model determines at least a first technique for adjusting a set of parameters in a second image of the electronic document to prepare the second image for optical character recognition (OCR)

DETAILED DESCRIPTION

Figure 1:
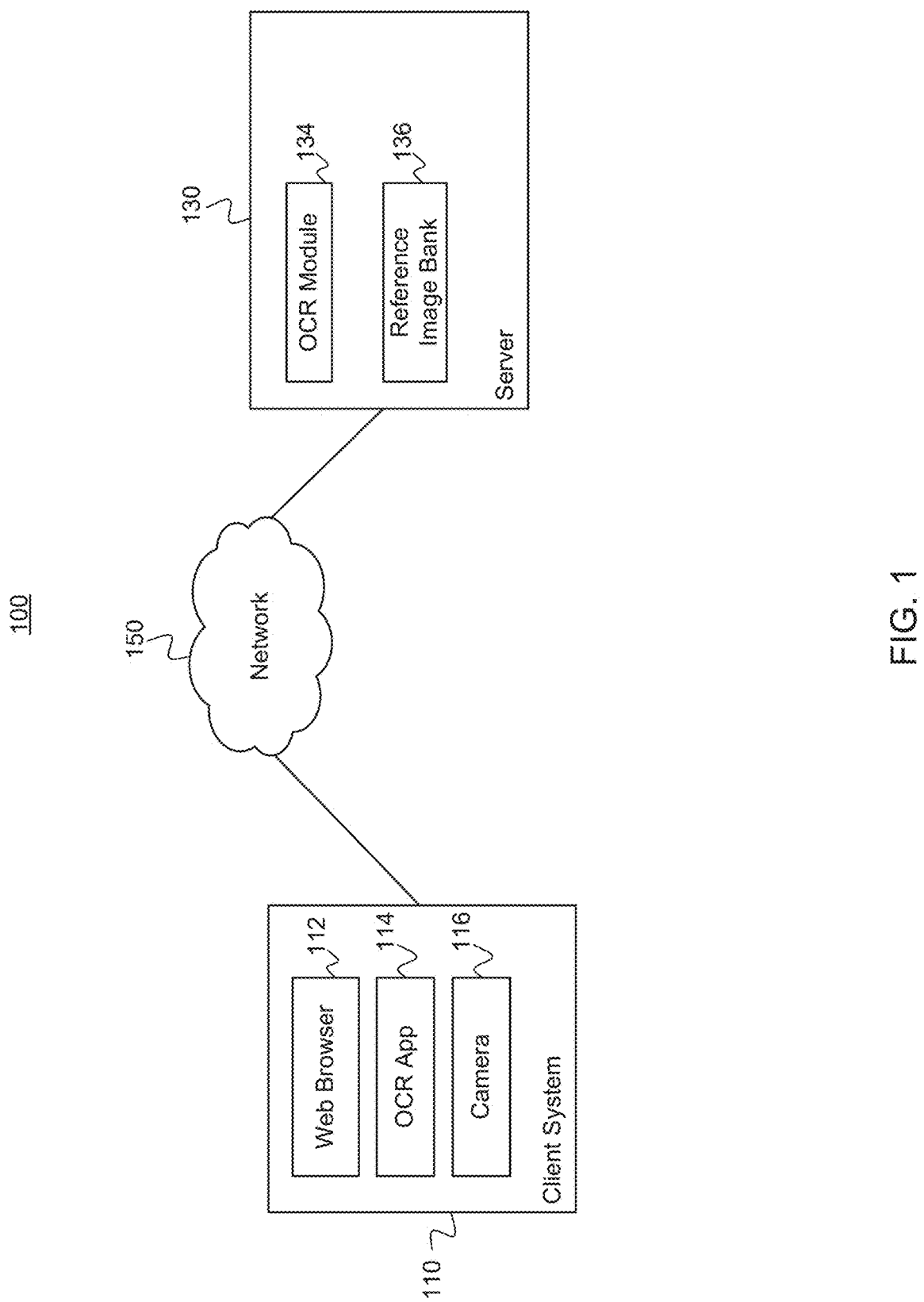
FIG. 1 illustrates an example of a computing environment 100 used to perform OCR on a document, in accordance with certain aspects of the present disclosure.

Embodiments presented herein provide techniques for assessing and improving quality of images of documents for optical character recognition (OCR). Traditionally images are obtained from various sources, subjectively evaluated, and an attempt is made to determine the viability of the images using a very limited source image set. When dealing with a small number of devices with a limited set of image capture conditions and related operational parameters, optimizing the images using the traditional optimization techniques may work. However, these traditional techniques are not scalable and do not provide the operational parameters that affect image quality.

Conventional systems attempt to obtain as many source images as possible, do a crude subjective categorization and then determine accuracy of OCR with respect to a candidate image based on the image set. However, conventional systems have access to a very limited image set since raw test images are generally obtained from a single image source or a select number of images are obtained from multiple sources. The limited image set tends to bias the results of image processing since the analysis tends to be biased on the limited set of images as a whole without isolating the specific characteristics that may affect accuracy. There is generally little opportunity to discern the specific characteristics that affect accuracy or degrade OCR. Providing raw images does not allow for the isolation of very specific image characteristics that may affect OCR accuracy, and subsequently the ability to tune or adjust for those anomalies in the image. Evaluating images as a whole (especially from small image sets) does not allow correlation of image correction techniques with specific measurable values. For example, if we know that a specific histogram (gathered from image analysis) results in better recognition applying a certain binarization threshold, the process may be further refined to determine a function that varies the binarization threshold over a range of histograms. Looking at entire images and subjectively categorizing them does not allow for this subtle correlation to be made.

Aspects of the present disclosure provide a scalable technique for optimizing (e.g., improving quality) images for OCR. These techniques allow generation of a large amount of test images representing real life images with various kinds and amounts of distortions by an automated random process and include determining the operational parameters affecting the quality of an image, and determining how and to what extent the determined parameters are to be adjusted to improve the quality of the image to acceptable levels for OCR. The techniques also include determining whether or not an image may be optimized for OCR.

In some cases, data may be included in a document such as a word-processing document, spreadsheet, Portable Document Format (PDF) document, web page, paper document or another type of formatted document containing structured or semi-structured data. For example, the document may be a bill, invoice, form, statement, transcript, record, receipt, tax document (e.g., W-2, 1099-Int, 1099-Dive, consolidated brokerage statement, 1040, 1040A, 1040EZ, Schedule A, Schedule C), or other type of document that includes a specific type or set of data without adhering to a strict layout or format for showing the data. Further references to "document" in the following description include all forms of documents noted above.

Optical character recognition (OCR) systems are generally used to detect text present in an image of a document (e.g., a tax document) and to convert the detected text into its equivalent electronic representation for use in certain applications (e.g. tax applications).

Easy access to computing devices including personal computers (PCs) and portable computing devices (e.g., smart phones) and plentiful network bandwidth have made these computing devices very popular for sharing and processing data. For instance, users may easily download and execute a range of applications on their computing devices such as PCs, tablets and smartphones to process and share data. Factors such as larger screen sizes, increased computational capabilities, and inherent portability and convenience have made such devices the favorite computing platform of many users.

These computing devices generally include or support camera devices that may be used to capture images of documents (e.g., tax documents) for OCR of data (e.g., text and non-text) included in the documents. In order to accurately recognize text with an OCR engine, the image typically needs to be of a high quality. However, images produced, for example, using digital cameras and other devices may include many distortions and may produce images of poor quality. An image produced using such a device may include various forms of distortion including blur, skew, rotation, shadow marks and other forms of distortion. Each image is associated with a combination of these parameters and a quality of the image is generally dictated by the values each of these parameters take. Each of these parameters typically has a base value representative of an ideal or close to ideal value and any deviation from this value may adversely affect the quality of an image with respect to the parameter. Generally, a larger deviation from the base value of a parameter leads to a larger distortion of the image with respect to the parameter.

Thus, an image generally needs to be processed to optimize parameters which contribute to image distortion and to improve image quality for subsequent OCR. In some cases, determining the quality of an image, and determining the operational parameters of an OCR system is difficult due the factors discussed above. This difficulty is further compounded when the number potential sources of the images and the various operational parameters these sources contribute associated with quality of an image are considered. For example, mobile devices may be associated with parameters including differing operating systems, cameras, versions, on-device image processing and the like. Scanners may be associated with parameters including resolution, gamuts, feed quality, and the like. PC cameras may be associated with parameters including resolutions, image framing, quality and the like. Each of these parameters associated with an image needs to be determined and optimized to optimize the quality of the image for OCR.

Further, various methods may be used to adjust each parameter or a combination of parameters associated with the quality of an image, in order to improve the quality of the image. For example, binarization is a method that is used to turn a color image into a black and white image. Different techniques may be used to perform binarization of an image. Each of these techniques may further include various parameters that may affect and alter the result of the binarization, which may need to be optimized to optimize the binarization.

Traditionally images are obtained from the various sources discussed above, subjectively evaluated, and an attempt is made to determine the viability of the images using a very limited source image set. For example, if a particular technique of binarization generally achieves good results for a number of images, the technique is chosen and used for all images. Thus, the binarization technique and associated parameters are not optimized for each image.

When we are dealing with a small number of devices with a limited set of image capture conditions and related operational parameters, optimizing the images using the traditional optimization techniques may work. However, these traditional techniques are not scalable and do not provide the operational parameters that affect image quality. Thus, there is a need for a scalable solution that objectively defines the operating parameters.

Aspects of the present disclosure provide a scalable technique for optimization (e.g., improving quality) of images for OCR. These techniques include determining the operational parameters affecting the quality of an image, and determining how and to what extent the determined parameters are to be adjusted to improve the quality of the image to acceptable levels for OCR. The techniques also include determining whether or not an image may be optimized for OCR.

In certain aspects, a computing device may be configured to obtain one or more reference images of a document. In an aspect, each of the reference images represents a high quality digital representation of the document in which values of parameters associated with the quality of the document are within acceptable ranges. In particular, the computing device may obtain high quality electronic (also referred to as "digital") images of the documents. The documents may correspond to different structured or semi-structured documents, e.g., tax forms. The electronic images may correspond to electronic versions of the documents (e.g., PDF or Microsoft Word formats), or may correspond to high quality captured images of a physical document that are captured using an image capturing device, such as a camera phone, video camera, digital camera, digital scanner, etc., that is connected to or implemented in the computing device, or separate from the computing device.

The computing device may deliberately distort (e.g., reduce in quality) an obtained reference image by adjusting values of one or more parameters (e.g., blur, skew, rotation, shadow marks and other forms of distortion) associated with the quality of the image by known amounts to deviate from their acceptable value ranges. The goal is to generate images that are representative of typical images in real life scenarios. By modifying the high quality reference images to generate the distorted images, the computing device has control over the process and exactly knows what parameters and by what amounts the parameters were adjusted. This is more practical than looking up thousands of images, and addresses the industry problem of limited image sets available for evaluation and system training. The computing device may then analyze the deliberately distorted reference image using an independent process to attempt to determine the parameters that need to be adjusted and to what extent the values of these parameters are to be adjusted to optimize the distorted image, that is, bring the distorted reference image close to its original quality.

As the computing device already knows what parameters were adjusted and by what amounts were they adjusted for distorting the reference image, it may determine whether the independent process successfully determined one or more of the parameters that were adjusted and the accuracy of the determined adjustment amounts by comparing the results of the analyzing by the independent process with the information regarding the distorting of the reference images. Thus, this technique provides the operating parameters and provides a correlation of the parameters to accuracy. The distorted images and other information including the information relating to the distortion of the reference images, the operational parameters and accuracy of the distorted image analysis is used to train a computer model (e.g., a Convolutional Neural Network, CNN).

In certain aspects, when a client image of a candidate document is presented to the computing system, the computing device, based on the trained computer model, determines a set of parameters that need to be adjusted and by what amounts these parameters need to be adjusted (e.g., to bring the parameter values within acceptable ranges) in order to improve the quality of the image for OCR. The computer model (or another process of the computing system) further determines one or more techniques (e.g., techniques for binarization, rotation, de-skew, keystone correction etc.) for adjusting the determined parameters by the determined amounts. In certain aspects, the computing system, based on the trained computer model, may determine whether or not the quality of the client image may be improved to an acceptable level for OCR. If not, the client image may be discarded and the client may be asked to capture another image of the candidate document.

Different aspects of these techniques are described in more detail herein, along with additional examples of how the techniques may be used to assess and improve image quality to perform OCR.

FIG. 1 illustrates an example of a computing environment 100 used to perform OCR on a document, in accordance with certain aspects of the present disclosure. As shown, the computing environment 100 includes client system 110, a mobile device 120, and a server 130, each connected to a network 150. The network 150, in general, may be a wide area network (WAN), local area network (LAN), wireless LAN (WLAN), personal area network (PAN), a cellular network, or any other technology that allows devices to communicate electronically with other devices. In a particular embodiment, the network 150 is the Internet.

Client system 110 is included to be representative of a general purpose computing system hosting software applications that may be installed and run locally, or may be used to access applications running on the server 130. The client system 110 may include mobile computing systems including smart phones, tablet computers, laptop computers, or any other mobile computing devices or systems capable of running software applications, capturing images and communicating over a network (e.g., the internet). In an aspect, client system 110 includes non-mobile computing devices such as desktop computers or other non-mobile computing devices capable of capturing images and communicating over a network (e.g., the internet). As shown, client system 110 includes web browser 112 used to access the server 130 by rendering web pages (e.g., generated by the OCR module 134) from or running applications on the server 130. In certain aspects, the web browser 112 may include mobile versions of the web browser 112 when the client system 110 is a mobile computing system such as a smart phone or a tablet computer. The client system 110 includes an OCR app 114. The OCR app 114 may be a local application that is installed and run locally on the client system 110. In certain aspects, the OCR app 114 may be representative of a component of a client server application (or other distributed application) which can communicate with the server 130 over network 150. For example, OCR app 114 may be a "thin" client where the processing is largely directed by the OCR app 114, but performed by computing systems of the server 130 or a software application installed on client system 110. The client system 110 may further include a camera 116 for capturing images. The client system 110 may also include other devices that may be used for image capturing, for example, a digital scanner (not shown).

As shown, the server 130 includes an OCR module 134 that may run locally on the server 130. Further, the OCR module 134 may be accessed and executed by devices on the network 150, such as the client system 110. The OCR module 134, for example, may generate web pages that are rendered by a browser such as browser 112. In another example, OCR module 134 may be accessed by or work along with client side applications, such as OCR app 114 as discussed.

In certain aspects, the OCR app 114 and the OCR module 134 may be used to implement the techniques for facilitating identifying information in a document in accordance with aspects of the present disclosure. For example, the OCR module 134 may perform an offline process including obtaining high quality reference images corresponding to various documents, deliberately distorting the reference images by adjusting one or more quality parameters by known amounts to generate distorted images representative of real life images, analyzing the distorted images to attempt to detect the parameters and the adjusted values, determining accuracy of the detection, and training a computer model (e.g., CNN) using the distorted reference images and information regarding the distorting, analyzing and determined accuracy of detection.

OCR app 114 may start a run-time process by obtaining a client image of a candidate document. The OCR module 134 at the server 130 may receive the obtained client image from the client system 110 over the network 150 and determine a set of parameters that are to be adjusted and by what amounts the determined parameters are to be adjusted based on the trained computer model of the offline process, and determine one or more techniques to be used for adjusting the determined parameters by the determined amounts for improving the quality of the client image (e.g., optimize the client image) for OCR. The OCR module 134 may process the client image by adjusting the determined parameters by the determined amounts to improve the quality of the client image for OCR. In an aspect, the results of analyzing the client image based on the trained computer model (e.g., determined parameters, adjustment values, and adjustment techniques) may be communicated to the client system 110 and the client image may be adjusted by the OCR app 114 based on the received results.

The runtime process may further include performing OCR on the optimized client image. In an aspect, the OCR is performed by the OCR app 114 at the client system 110. In an alternative aspect, the OCR is performed by the OCR module 134 at the server 130 and the results of the OCR are communicated to the client system 110. The runtime process may also determine whether a client image is viable or not for OCR recognition. If not, the client image may be discarded and the client system 110 or the mobile device 120 may be directed to capture another image of the candidate document. In an aspect, this step is performed by the OCR module at the server 110 and the results including whether or not the client image is viable for OCR are communicated to the client system 110.

In certain aspects, the client image of the candidate document may be obtained by capturing the image of the document using the camera 116 of the client system 110, or other image capturing mechanisms available at the client system 110. In an aspect, the image of the candidate document may include an electronic version of the candidate document (e.g., in PDF format, Microsoft Word format etc.).

In certain aspects, the offline processing and run time processing may be performed independently by the OCR app 114 and the OCR module 134 or may be distributed over the OCR app 114 and the OCR module 134 as discussed above. For example, if the client system 110 includes relatively powerful computing system, one or more processing steps of the offline and run time processes may be carried out by the client system 110. However, if the client system is a mobile computing system with limited processing capabilities, most of the offline and runtime processing may be carried out at the server 130.

In certain aspects, OCR module 134 may obtain the set of reference images for the offline processing from production images stored locally at the server (e.g., reference image bank 136) or received from the client system 110. In an aspect, one or more of the reference images may be captured by an operator of the client system 110 using camera 116 and may be sent to the server 130. In an aspect, reference images include electronic versions of one or more documents (e.g., in PDF format, Microsoft Word format etc.). In certain aspects, the client image may be captured at the client system 110 and may be sent to the server 130 for run-time processing by OCR module 134, for example, in order to take advantage of relatively faster processing speeds at the server 130. The results of the run-time process (e.g., labels and corresponding values identified in the document as a result of OCR) may be sent back to the client system 110, for example, for use by one or more applications at these devices (e.g., tax preparation application).

Figure 2:
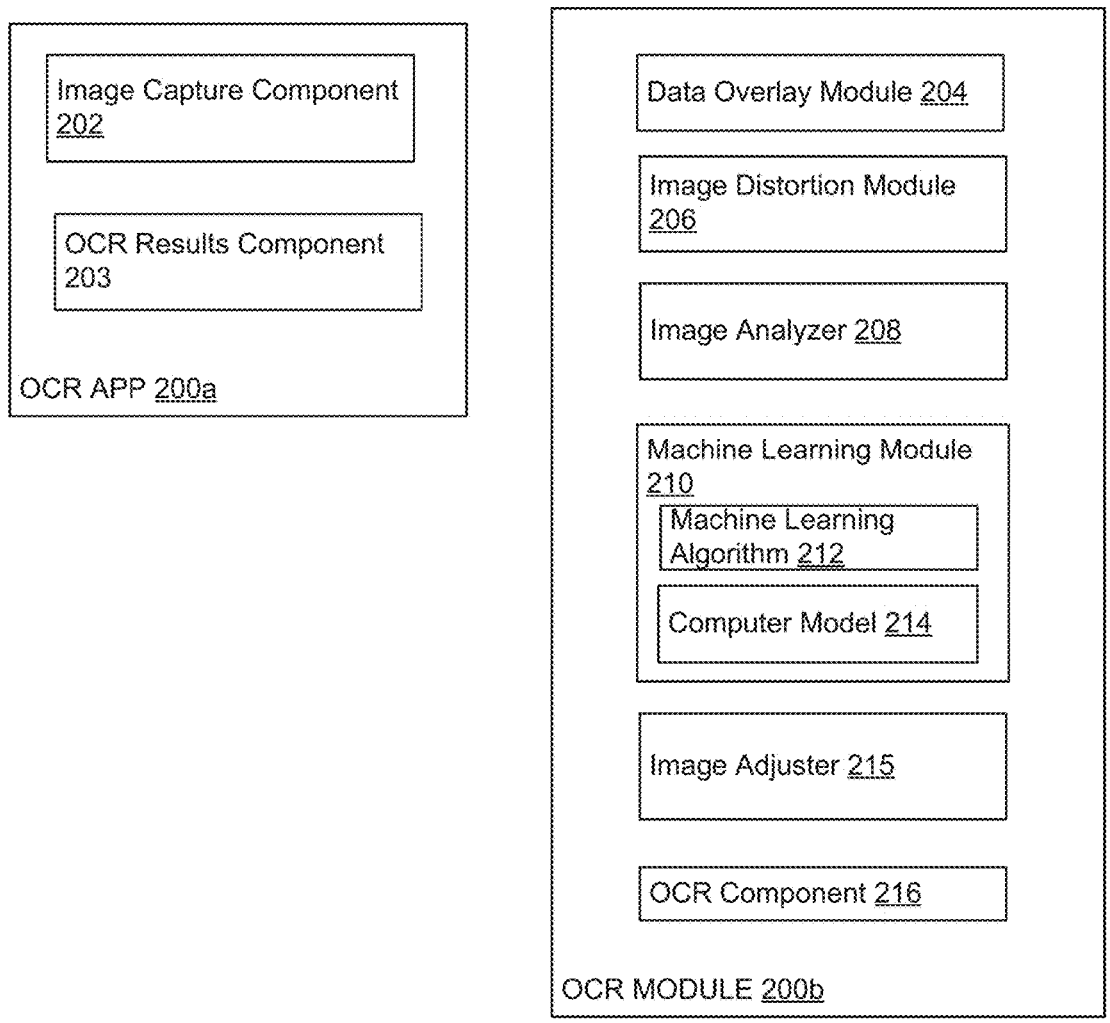
FIG. 2 illustrates an OCR app, in accordance with certain aspects of the present disclosure.

FIG. 2 illustrates an OCR app 200a (e.g. OCR app 114 as shown in FIG. 1) and an OCR module 200b (e.g., OCR module 134 as shown in FIG. 1), in accordance with certain aspects of the present disclosure. As shown in FIG. 2, OCR app 200a includes an image capture component 202 and an OCR results. The OCR module includes a data overlay module 204, an image distortion module 206, an image analyzer 208, a machine learning module 210, an image adjuster 215 and an OCR component 216. The machine learning module 210 further includes machine learning algorithm 212 and a computer model 214.

At the OCR app 200a, the image capture component 202 controls an image capture device (e.g., camera 116 of client system 110 of FIG. 1) to obtain image of a document. In certain aspects, the images captured by the image capture component 202 may include client images that need to be processed for carrying out OCR as part of runtime processing or reference images used to train a computer model (e.g., computer model 214) as part of offline processing as discussed above. In an aspect, the images captured by the image capture component 202 are sent to the OCR module 200b for further processing.

The OCR module 200b may obtain a reference image of a particular document from a local storage or a storage server over a network (e.g., network 150) or may use a high quality image of the document captured by an image capture device (e.g., camera 116) at a client system as a reference image. The data overlay module 204 overlays data (e.g., associates data) upon a reference image. The data may include information regarding at least one characteristic corresponding to the reference image including a type of the reference image (e.g., tax form W2, 1099 etc.), labels within the reference image (e.g., Name, SSN etc.), and formats of values associated with the labels (e.g., SSN format). The overlaid information may improve accuracy of OCR. In an aspect, this information may also be used to train the computer model 214.

Image distortion module 206 deliberately distorts reference images by adjusting values of one or more quality parameters associated with the images by known amounts to generate one or more distorted images that are representative of real life images.

The image analyzer 208 analyzes the distorted reference images to attempt to detect the adjusted parameters and their adjustment values. The image analyzer 208 further determines an accuracy of the detection by determining how accurately the adjusted parameters and the adjusted values were detected.

The machine learning module 210 includes a machine learning algorithm 212 that trains a computer model 214 using the distorted reference images and information regarding the distorting, image analysis and the determined accuracy of detection of the parameters and the adjusted values. The trained computer model 214 accepts client images (e.g., client images captured by the image capture component 202 and received from the OCR app 202a) and determines a set of parameters that are to be adjusted and by what amounts the determined parameters are to be adjusted, and further determines one or more techniques to be used for adjusting the determined parameters by the determined amounts for improving the quality of the client image for OCR. The trained computer model also determines whether a client image is viable or not for OCR. If not, the image capture component 202 may be directed to capture another image of the candidate document.

The image adjuster 215 adjusts a client image by adjusting the determined parameters by the determined amounts to improve the quality of the client image for OCR.

The OCR component 216 evaluates the adjusted/optimized client images to identify what text or numeric content is depicted in the images. The results of the OCR including the identified text and numeric content is sent to the OCR results component 203 at the OCR app 200a for use by one or more applications (e.g., tax related applications) at a client system (e.g., client system 110 of FIG. 1).

Figure 3:
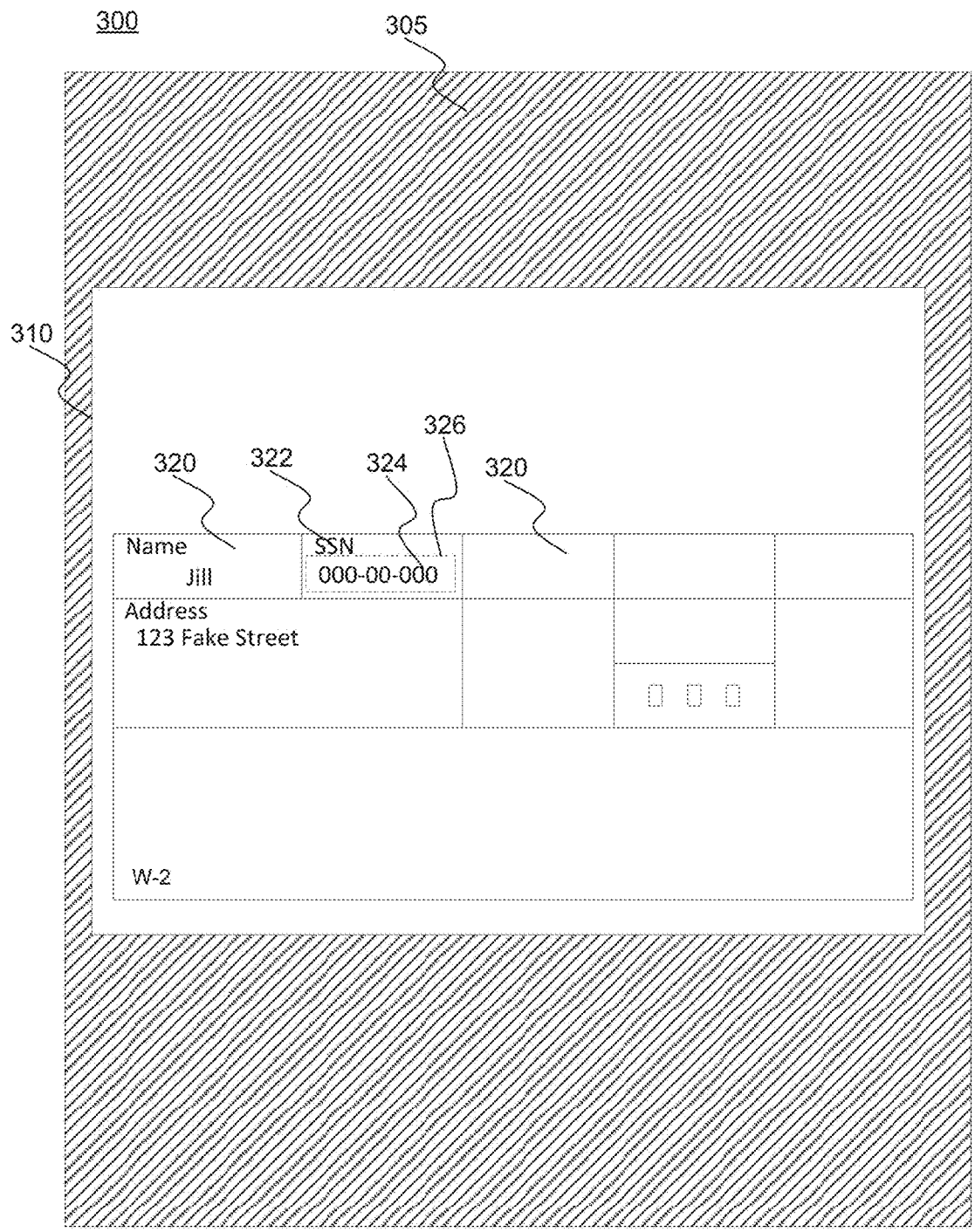
FIG. 3 illustrates an example electronic image including a document 310, in accordance with certain aspects of the present disclosure.

FIG. 3 illustrates an example electronic image 300 including a document 310, in accordance with certain aspects of the present disclosure. In the embodiment shown, the electronic image 300 includes the document 310 in a portion of the electronic image 300, as well as other background imagery 305. For example, the electronic image 300, as shown, may correspond to a client image of the document 310 captured using an image capture device (e.g., camera of a mobile device) and include the background imagery 305 (e.g. the physical surface upon which the document is placed by a customer, so that the customer can acquire an image of the document with her/his device camera). However, in some other embodiments, the electronic image 300 may not include any background imagery 305, for example, the electronic image 300 corresponds to a high quality electronic version of the document 310 and may be used as a reference image, or if the customer is providing an electronic version of a document 310.

In certain aspect, a client image (e.g., image 300) of a candidate document (e.g., document 310) captured using a camera device (e.g., camera 116 or 126) may include several distortions including blur, rotation, skew, or background imagery 305. Aspects of the present disclosure discuss techniques for improving quality of a client image including adjusting parameters corresponding to these distortions.

The document 310, as shown, may be a form (e.g., tax form such as a W2). The document 310 includes a number of elements 320 (e.g., grid elements, boxes, rectangles, etc.). The elements 320 may correspond to areas on the document 310 where textual information may be found. For example, an element 320 may include a label 322 (e.g., text label), which may indicate the type of data (e.g., social security number (SSN)) that is within the element 320. The element 320 may further include a value 324 (e.g., text), which may be the actual value of the textual information (e.g., SSN) included in the element. The value 324 may be found within a region 326 (e.g., a text entry area) within the element 320 designated as the location for the value 324. Aspects of the present disclosure identify such elements 320 and regions 326 within a document 310 via segmentation, identifying at least labels (e.g., label 322) of the document 310 and formats of corresponding values for overlaying upon a reference document.

Figure 4:
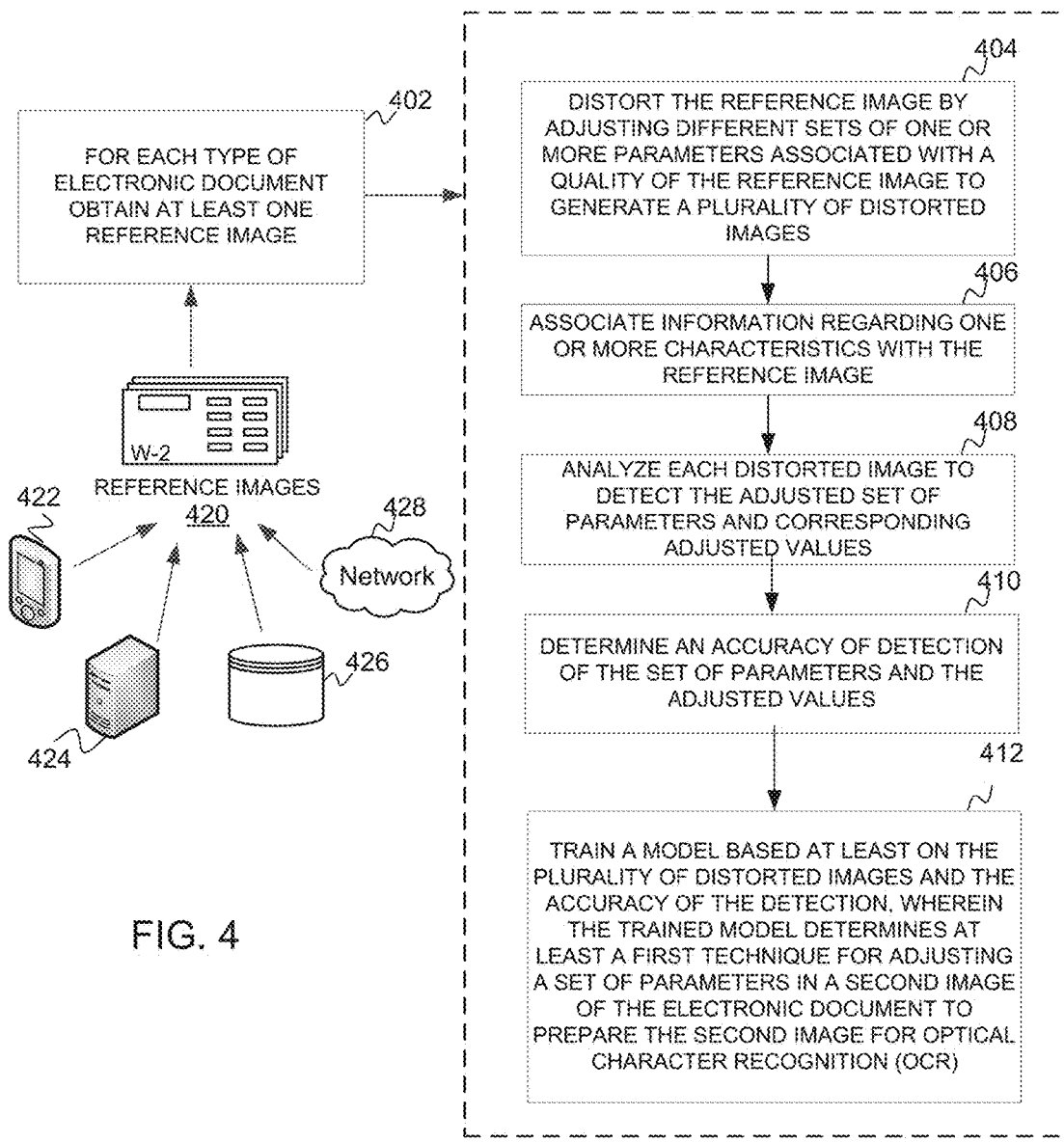
FIG. 4 illustrates example operations performed as part of an offline process used for identifying information in a document, in accordance with certain aspects of the present disclosure.

FIG. 4 illustrates example operations performed as part of an offline process 400 used for identifying information in a document, in accordance with certain aspects of the present disclosure. Offline process 400 begins, at 402 by obtaining, for each type of document at least one reference image. In an aspect, the document is a semi-structured document such as a W2 tax document. In some aspects, the document may be a structured document. In an aspect, the reference image for a particular type of document is selected from a pool of reference images 420 corresponding to several types of documents. For example, the pool of images 420 may include a reference image for each type of document (e.g., bill, invoice, standard form, statement, transcript, record, receipt, or tax document) and a reference image may be selected from the pool for further processing that corresponds to a particular type of document frequently requested for OCR. In certain aspects, the pool of reference images 420 may be constructed by obtaining the images from multiple sources. For example, as shown in FIG. 4, reference images may be obtained from an end user device (e.g., mobile device 422), which, for example are captured using an image capturing device or available as electronic versions. Similarly, the reference images may be obtained from a server 424, a local storage 426 or over a network 428 (e.g., stored in a cloud or other remote computing system).

As noted above, each of the reference images represents a high quality digital representation of a document in which values of parameters associated with the quality of the image are within acceptable ranges.

At 404, each of the obtained reference image is deliberately distorted (e.g., reduced in quality) adjusting different sets of one or more parameters associated with a quality of the reference image to generate a plurality of distorted images. For example, to generate each distorted image values of one or more parameters associated with the quality of the reference image are adjusted by known amounts to deviate from their acceptable value ranges. As noted above, the goal is to generate images that are representative of typical real life images, for example, captured using a camera device on a mobile device. In certain aspects, different combinations of parameters may be adjusted (or the same combination of parameters may be adjusted by different amounts) to obtain a plurality of distorted images with respect to the reference image, each distorted image representative of a real life client image. In an aspect, a random process is used to model the distribution of various parameters (e.g., blur, luminosity, skew etc.) in a real world scenario to produce the distorted images.

At 406 information regarding one or more characteristics is associated with the reference image. The information may include a type of the reference image (e.g., tax form W2, 1099 etc.), labels within the reference image (e.g., Name, SSN etc.), and formats of values associated with the labels (e.g., SSN format). In an aspect, regions are identified (e.g., via a segmentation technique) within a reference image as corresponding to certain types of data (e.g., labels, values etc.) included in the document based on information known about the document. These regions are identified within the reference image and associated with the reference image to improve accuracy of OCR.

At 408, each of the deliberately distorted reference images is analyzed using an independent process to attempt to detect the adjusted parameters and to what extent the values of these parameters were adjusted. In an aspect, analysis of the distorted reference image is performed using a combination of EXIF data and simple machine learning techniques. The machine learning techniques use a simple anomaly classification of trained anomalies that are used to classify the extent of aberrations (e.g., distortions), for example, significance of blur, apparent contrast, overall luminosity, etc. These aberrations are pre-trained and use a simple scale that may be reproduced through artificial means (e.g., Gaussian blur, binarization, color balance adjustments, etc.)

At 410, it is determined how accurately the adjusted parameters and their corresponding adjusted values were detected. As the process already knows what parameters were adjusted and by what amounts were they adjusted for distorting the reference image, it may determine whether the independent process successfully determined one or more of the parameters that were adjusted and the accuracy of the determined adjustment amounts by comparing the results of the analyzing by the independent process with the information regarding the distorting of the reference image. For example, if the skew parameter of the reference image was adjusted by 20% the system ideally should detect that the skew parameter was adjusted and that the adjustment value is 20%. Thus, by comparing the result of analyzing the distorted reference image and the known adjust parameters and corresponding values, the system may determine how accurately are the parameters and adjusted amounts are detected.

At 412, a model (e.g., computer model including CNN) is trained based at least on the distorted reference images and the determined accuracy of detecting the parameters and their corresponding adjustment values, the trained computer model to be used to determine at least one technique for adjusting a set of parameters in a second client image (e.g., that corresponds to the distorted reference image in quality) to prepare the image for OCR.

Figure 5:
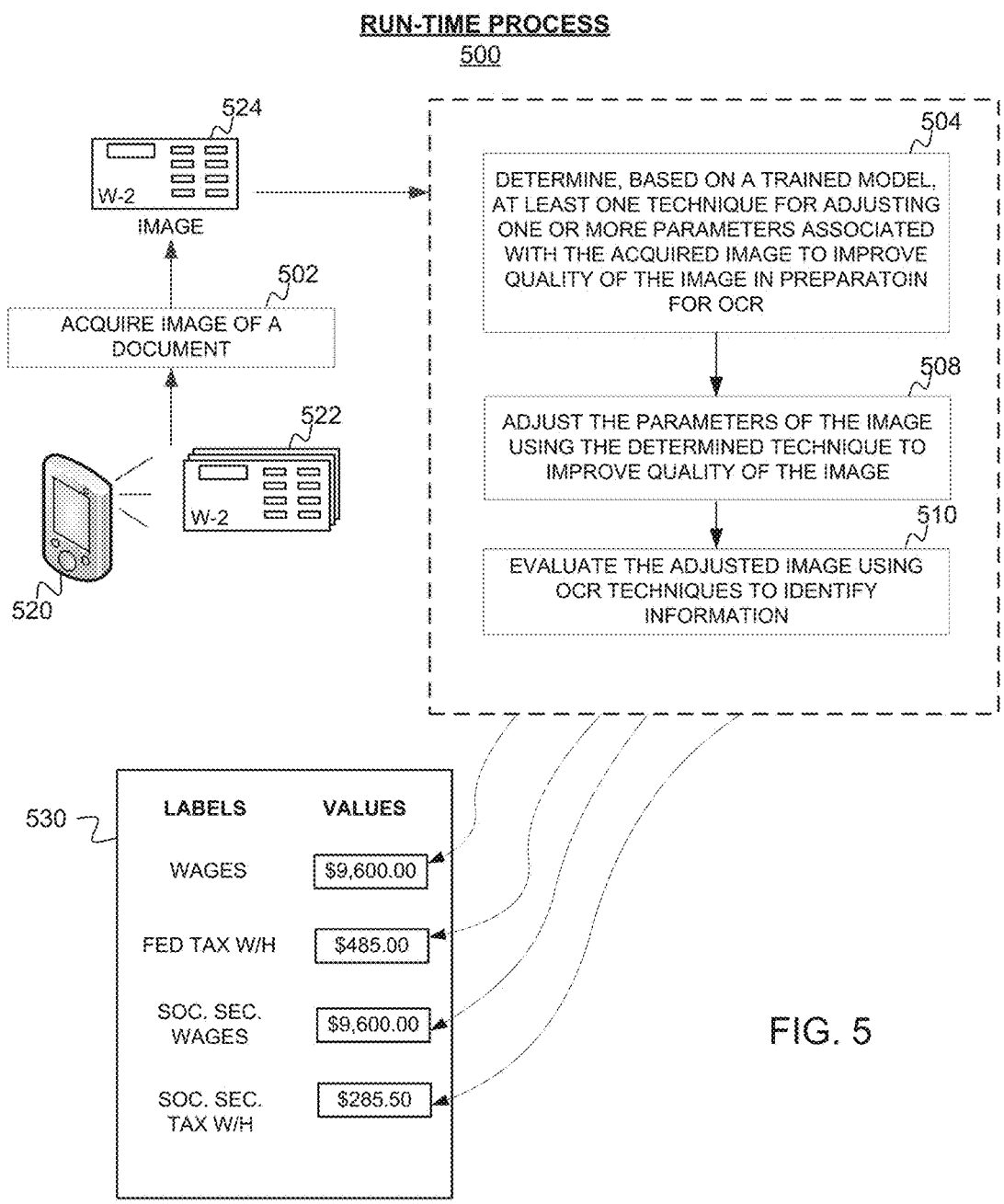
FIG. 5 illustrates example operations performed as part of a run-time process used for identifying information in a document, in accordance with certain aspects of the present disclosure.

FIG. 5 illustrates example operations performed as part of a run time process 500 performed as part of a run-time process used for identifying information in a document, in accordance with certain aspects of the present disclosure.

At 502, an image (e.g., client image) 524 of a candidate document is obtained. In an aspect, the candidate document corresponds to the document whose reference image was processed in the offline process of FIG. 4. For example, the candidate document is a semi-structured document such as a W2 tax document. In an aspect, the image 524 is captured using a camera of a mobile device (e.g. mobile device 520). In an aspect, a user may capture multiple images of the candidate document and may manually select the image 524 from the multiple captured images for further processing.

At 504, based on the trained model of the offline process 400 of FIG. 4, at least one technique is determined for adjusting one or more parameters associated with the acquired image 524 to improve the quality of the image in preparation for OCR. In an aspect, it is also determined how much these parameters are to be adjusted to optimize the client image for OCR.

At 510 the adjusted/optimized client image is evaluated using OCR techniques to identify information from the client image.

In certain aspects, once OCR of the optimized client image is completed, accuracy of the OCR may be determined. For example, an operator may manually check the identified information and confirm if various text/values were accurately identified. If the operator determines that certain information was not accurately identified, the optimized/adjusted client images may be feed back to the computer model to repeat the process of determining parameters, corresponding adjustment values and techniques for adjustment to improve the OCR. With this feedback loop the computer model may learn how best to optimize certain parameters.

In an aspect, the identified information (e.g., including labels and corresponding obtained values of a W2 tax document) may be used for further processing of data by one or more applications at a device. For example, the identified labels and values of a candidate W2 tax document may be used to populate labels and value fields in an interface 530 of a tax preparation application at a mobile device.

Figure 6:
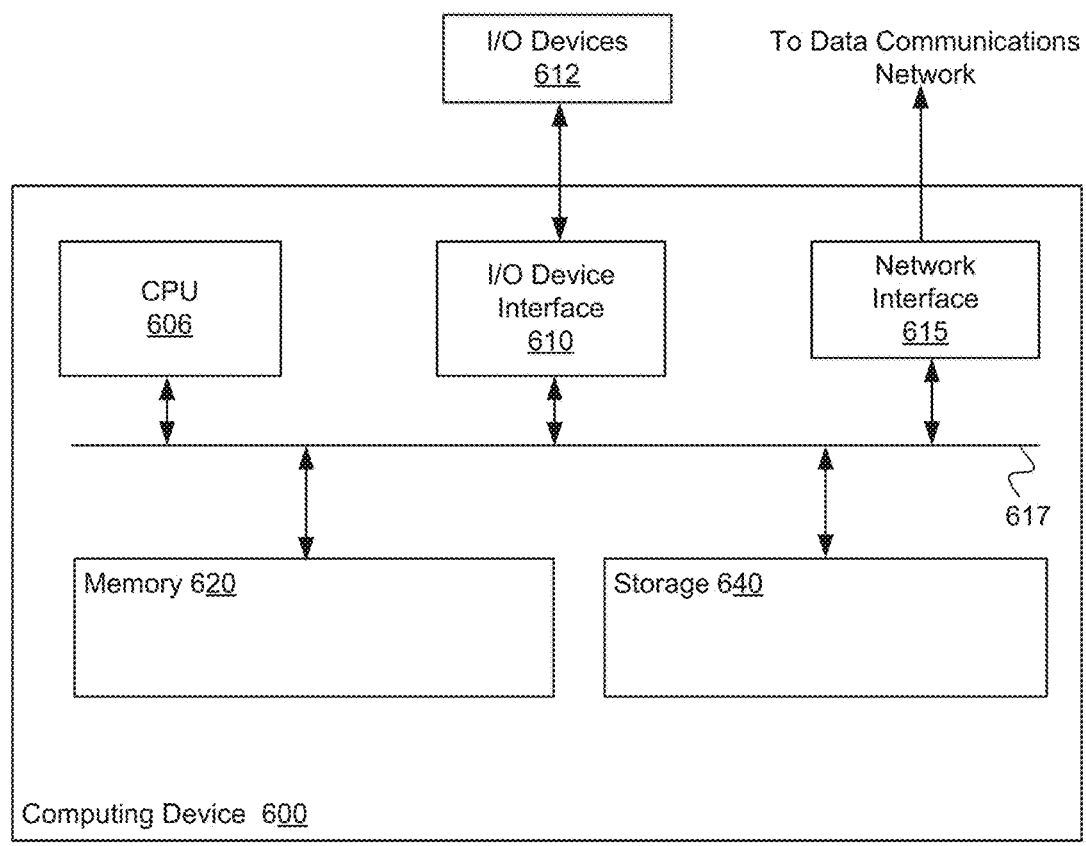
FIG. 6 illustrates an example computing system used to identify information in a document, in accordance with certain aspects of the present disclosure.

FIG. 6 illustrates an example computing system 600 used to identify information in a document, in accordance with certain aspects of the present disclosure. In an aspect, the computing system 600 is used to process one or more steps related to image quality assessment and improvement discussed above and store related information including one or more components shown in FIGS. 1 and 2. As shown, the computing system 600 includes, without limitation, a central processing unit (CPU) 606, a network interface 615, a memory 620, and storage 640, each connected to a bus 617. The computing system 600 may also include an I/O device interface 610 connecting I/O devices 612 (e.g., keyboard, display, mouse devices, image capture devices, etc.) to the computing system 600. Further, the computing elements shown in computing system 600 may correspond to a physical computing system (e.g., a system in a data center), a physical computing system with one or more components being accessed via a network, or may be a virtual computing instance executing within a computing cloud.

The CPU 606 retrieves and executes programming instructions stored in the memory 620 as well as stored in the storage 640. The bus 617 is used to transmit programming instructions and application data between the CPU 606, I/O device interface 610, storage 640, network interface 615, and memory 620. It may be noted that CPU 606 is included to be representative of a single CPU, multiple CPUs, a single CPU having multiple processing cores, and the like, and the memory 640 is generally included to be representative of a random access memory or other volatile memory. The storage 640 may be a disk drive, or flash storage device, or other non-volatile memory device. Although shown as a single unit, the storage 640 may be a combination of fixed and/or removable storage devices, such as fixed disc drives, removable memory cards, optical storage, network attached storage (NAS), or a storage area-network (SAN).

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for identifying information in an electronic document, comprising:
obtaining a reference image of the electronic document;
distorting the reference image by adjusting parameter values for a plurality of sets of parameters associated with a quality of the reference image to generate a plurality of distorted images;
for each distorted image:
analyzing the distorted image to attempt to detect a first set of parameters from the plurality of sets of parameters and corresponding parameter values used to generate the distorted image;
determining an accuracy of detection of the first set of parameters and the corresponding parameter values used to generate the distorted image, the determining including:
comparing each detected parameter determined as a result of the analyzing the distorted image with the first set of parameters used for generating the distorted image, and
determining the accuracy of the detection based on the comparison; and
training a model based at least on the plurality of distorted images and respective accuracies of the detection to generate a trained model;
obtaining a second image of the electronic document;
determining, based on the trained model, a second set of parameters to be adjusted in the second image and a value corresponding to each parameter in the second set by which the parameter is to be adjusted;
determining, based on the trained model, at least one technique for adjusting each parameter in the second set of parameters in the second image to prepare the second image for optical character recognition (OCR);
preparing the second image for the OCR by adjusting each determined parameter in the second set of parameters by a corresponding determined value based on a corresponding determined technique for the determined parameter to generate a prepared second image; and
performing OCR on the prepared second image.

2. The method of claim 1, wherein determining the accuracy of detection of the first set of parameters and the corresponding parameter values comprises:
comparing a detected parameter value corresponding to the detected parameter determined as a result of the analyzing the distorted image with a corresponding parameter value of a corresponding parameter from the first set of parameters used for the distorting the image; and
determining the accuracy of detection of the detected parameter value based on the comparison.

3. The method of claim 1, further comprising associating with the reference image information regarding a set of characteristics of the reference image, wherein the set of characteristics comprises at least one of a type of the reference image, a label associated with at least one region of the reference image or a format of a value associated with each label.

4. The method of claim 1, wherein the training comprises training the model based on the associated information regarding the set of characteristics.

5. The method of claim 1, further comprising determining, based on the trained model, whether a quality of the second image can be improved to an acceptable level for the OCR.

6. The method of claim 5, wherein determining whether the quality of the second image can be improved to an acceptable level comprises determining whether one or more of the second set of parameters can be adjusted by corresponding parameter values that are equal to or above threshold parameter values associated with the one or more of the second set of parameters.

7. The method of claim 1, further comprising:
determining accuracy of performing the OCR; and
feeding back the prepared second image into the model to improve accuracy of subsequent OCRs of the electronic document.

8. The method of claim 1, wherein distorting the reference image comprises modeling a distribution of a plurality of parameters using a random process.

9. The method of claim 1, wherein parameters in the plurality of sets of parameters comprise at least one of rotation, skew, shadow, luminosity, blur, or color density.

10. The method of claim 1, wherein each of the plurality of sets of parameters include a different combination of the parameters.

11. An apparatus for identifying information in an electronic document, comprising:
at least one processor configured to:
obtain a reference image of the electronic document;
distort the reference image by adjusting parameter values for a plurality of sets of parameters associated with a quality of the reference image to generate a plurality of distorted images;
for each distorted image;
analyze the distorted image to attempt to detect a first set of parameters from the plurality of sets or parameters and corresponding parameter values used to generate the distorted image;
determine an accuracy of detection of the first set of parameters and the corresponding parameter values used to generate the distorted image, wherein the at least one processor determines the accuracy of detection by;
comparing each detected parameter determined as a result of the analyzing the distorted image with the first set of parameters used for generating the distorted image; and
determining the accuracy of the detection based on the comparison; and
train a model based at least on the plurality of distorted images and respective accuracies of the detection to generate a trained model;
obtain a second image of the electronic document;
determine, based on the trained model, a second set of parameters to be adjusted in the second image and a value corresponding to each parameter in the second set by which the parameter is to be adjusted;
determine, based on the trained model, at least one technique for adjusting each parameter in the second set of parameters in the second image to prepare the second image for optical character recognition (OCR)
prepare the second image for the OCR by adjusting each determined parameter in the second set of parameters by a corresponding determined value based on a corresponding technique for the determined parameter to generate a prepared second image; and
perform OCR on the prepared second image; and
a memory coupled to the at least one processor.

12. The apparatus of claim 11, wherein the at least one processor determines the accuracy of detection of the first set of parameters and the corresponding parameter values by:
comparing a detected parameter value corresponding to the detected parameter determined as a result of the analyzing the distorted image with a corresponding parameter value of a corresponding parameter from the first set of parameters used for the distorting the image; and
determining the accuracy of detection of the detected parameter value based on the comparison.

13. The apparatus of claim 11, wherein the at least one processor is further configured to associate with the reference image information regarding a set of characteristics of the reference image, wherein the set of characteristics comprises at least one of a type of the reference image, a label associated with at least one region of the reference image or a format of a value associated with each label.

14. The apparatus of claim 11, wherein the training comprises training the model based on the associated information regarding the set of characteristics.

15. The apparatus of claim 11, wherein the at least one processor is further configured to determine, based on the trained model, whether a quality of the second image can be improved to an acceptable level for the OCR.

16. The apparatus of claim 15, wherein the at least one processor is configured to determine whether the quality of the second image can be improved to an acceptable level by determining whether one or more of the second set of parameters can be adjusted by corresponding values that are equal to or above threshold parameter values associated with the one or more of the second set of parameters.

17. The apparatus of claim 11, wherein the at least one processor is further configured to:
determine accuracy of performing the OCR; and
feed back the prepared second image into the model to improve accuracy of subsequent OCRs of the electronic document.

18. The apparatus of claim 11, wherein the at least one processor distorts the reference image by modeling a distribution of a plurality of parameters using a random process.

19. The apparatus of claim 11, wherein parameters in the plurality of sets of parameters comprise at least one of rotation, skew, shadow, luminosity, blur, or color density.

20. The apparatus of claim 11, wherein each of the plurality of sets of parameters includes a different combination of the parameters.

* * * * *